US009933671B2

(12) United States Patent
Dong et al.

(10) Patent No.: US 9,933,671 B2
(45) Date of Patent: Apr. 3, 2018

(54) ARRAY SUBSTRATE, MANUFACTURING METHOD THEREOF AND DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Zhifu Dong, Beijing (CN); Wei Xue, Beijing (CN); Ping Song, Beijing (CN); Hongmin Li, Beijing (CN)

(73) Assignees: BOE TECHNOLOGY GROUP CO., LTD., Beijing (CN); HEFEI BOE OPTOELECTRONICS TECHNOLOGY CO., LTD., Hefei Anhui (CN)

( * ) Notice: Subject to any disclaimer, the term of this patent is extended or adjusted under 35 U.S.C. 154(b) by 0 days.

(21) Appl. No.: 14/906,867

(22) PCT Filed: Aug. 11, 2015

(86) PCT No.: PCT/CN2015/086627
§ 371 (c)(1),
(2) Date: Jan. 21, 2016

(87) PCT Pub. No.: WO2016/155187
PCT Pub. Date: Oct. 6, 2016

(65) Prior Publication Data
US 2017/0108731 A1 Apr. 20, 2017

(30) Foreign Application Priority Data

Mar. 31, 2015 (CN) .......................... 2015 1 0148163

(51) Int. Cl.
H01L 27/14 (2006.01)
G02F 1/1343 (2006.01)
(Continued)

(52) U.S. Cl.
CPC ........ *G02F 1/13439* (2013.01); *G02F 1/1368* (2013.01); *G02F 1/133345* (2013.01);
(Continued)

(58) Field of Classification Search
CPC ......... G02F 1/133345; G02F 1/134309; G02F 1/136286
(Continued)

(56) References Cited

U.S. PATENT DOCUMENTS 6,433,841 B1 * 8/2002 Murade ............... G02F 1/13454
349/110
6,610,997 B2 * 8/2003 Murade ............. H01L 29/78609
257/306
(Continued)

FOREIGN PATENT DOCUMENTS

CN 101251696 8/2008
CN 103018982 4/2013
(Continued)

OTHER PUBLICATIONS

International Search Report and Written Opinion with English Language Translation, dated Dec. 10, 2015, Application No. PCT/CN2015/086627.
(Continued)

Primary Examiner — Tan N Tran
(74) Attorney, Agent, or Firm — Blakely Sokoloff Taylor & Zafman LLP

(57) ABSTRACT

The present invention relates to the field of display technology, and discloses an array substrate, a manufacturing method thereof and a display device, for reducing the light leakage of a display device. The array substrate comprises a plurality of pixel regions arranged in arrays on a base substrate, two adjacent ones of the pixel regions having a signal line arranged therebetween, and the pixel regions and
(Continued)

the signal line having a gap therebetween, wherein the array substrate further comprises at least one light-leakage-proof electrode arranged to be insulated from the pixel regions and the signal line, and the vertical projection of the light-leakage-proof electrode on the base substrate at least covers a portion of the vertical projection of the gap on the base substrate. The present invention is applicable in the field of display technology.

17 Claims, 4 Drawing Sheets

(51) Int. Cl.
   *G02F 1/1333* (2006.01)
   *G02F 1/1368* (2006.01)
   *G02F 1/1362* (2006.01)

(52) U.S. Cl.
   CPC .. *G02F 1/134309* (2013.01); *G02F 1/136286* (2013.01); *G02F 2001/136218* (2013.01); *G02F 2001/136295* (2013.01); *G02F 2201/121* (2013.01); *G02F 2201/123* (2013.01); *G02F 2203/66* (2013.01)

(58) Field of Classification Search
   USPC .............................................. 257/59, 72, 432
   See application file for complete search history.

(56) References Cited

U.S. PATENT DOCUMENTS

2006/0203172 A1    9/2006  Baek et al.
2009/0103035 A1    4/2009  Suzuki et al.

FOREIGN PATENT DOCUMENTS

| CN | 103293797 | 9/2013 |
| CN | 104698706 | 6/2015 |
| JP | 2009103925 | 5/2009 |

OTHER PUBLICATIONS

Office Action in Chinese Application No. 201510148163.9 dated Feb. 6, 2017, with English translation. 8 pages.
Office Action in Chinese Application No. 201510148163.9 dated Sep. 12, 2017, with English translation.

* cited by examiner

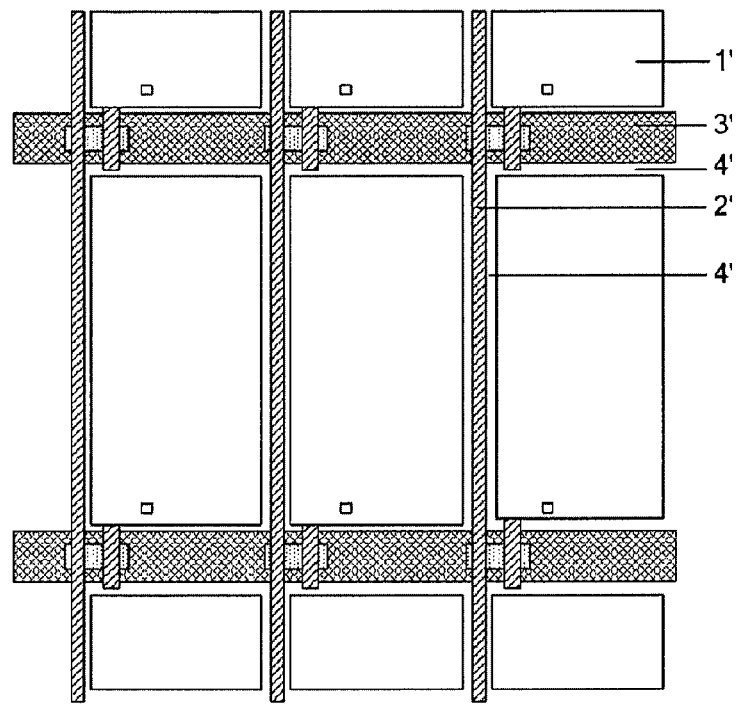
Fig. 1        - - Prior Art - -
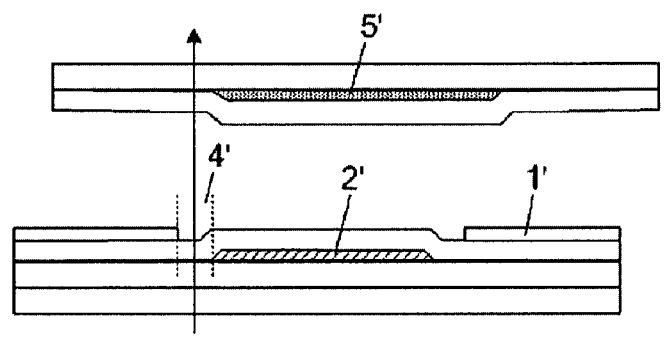
Fig. 2        - - Prior Art - -

ARRAY SUBSTRATE, MANUFACTURING METHOD THEREOF AND DISPLAY DEVICE

RELATED APPLICATIONS

The present application is the U.S. national phase entry of PCT/CN2015/086627, with an international filing date of Aug. 11, 2015, which claims the benefit of Chinese Patent Application No. 201510148163.9, filed on Mar. 31, 2015, the entire disclosures of which are incorporated herein by reference.

FIELD OF THE INVENTION

The present invention relates to the field of display technology, and in particular to an array substrate and a manufacturing method thereof, as well as a display device.

BACKGROUND ART

Currently, a common liquid crystal display device is a twisted nematic type liquid crystal display device in a normally white mode, the display device comprising an array substrate and a color filter substrate aligned with each other.

Exemplarily, as shown in FIG. 1, the array substrate comprises a plurality of pixel electrodes 1 arranged in arrays, a data line 2' situated between two adjacent columns of pixel electrodes 1', and a gate line 3' situated between two adjacent rows of pixel electrodes 1', wherein the pixel electrodes 1' and the data line 2' have a gap 4' therebetween, and the pixel electrodes 1' and the gate line 3' also have a gap 4' therebetween. The color filter substrate comprises a black matrix for shielding an area between two adjacent pixel electrodes 1', i.e., the data line 2', the gate line 3' and the gaps 4'.

However, the inventor of the present application found that, when the array substrate and the color filter substrate are quite misaligned along a direction in parallel with the extension direction of the gate line 3', as shown in FIG. 2, the black matrix 5' cannot fully shield the area between two adjacent pixel electrodes 1', and as a result, light will be emitted out of the display device through the gaps 4', which leads to light leakage of the display device, thereby reducing the contrast of the display device and influencing the display effect of the display device.

SUMMARY

The goal of the present invention is to provide a display substrate, a manufacturing method thereof and a display device, for reducing the light leakage of a display device.

To achieve the above goal, the present invention provides a display substrate by adopting a technical solution as follows.

An array substrate, comprising a plurality of pixel regions arranged in arrays on a base substrate, two adjacent ones of the pixel regions having a signal line arranged therebetween, the pixel regions and the signal line having a gap therebetween, wherein the array substrate further comprises at least one light-leakage-proof electrode arranged to be insulated from the pixel regions and the signal line, and the vertical projection of the light-leakage-proof electrode on the base substrate at least covers a portion of the vertical projection of the gap on the base substrate.

In the above array substrate provided according to embodiments of the present invention, since the array substrate comprises at least one light-leakage-proof electrode arranged to be insulated from the pixel regions and the signal line, and the vertical projection of the light-leakage-proof electrode on the base substrate at least covers a portion of the vertical projection of the gap on the base substrate, the light-leakage-proof electrode can at least shield a portion of light emitted by a light source towards the gap such that the portion of light cannot be emitted out of the display device, which reduces the light leakage of the display device, increases the contrast of the display device and ameliorates the display effect of the display device.

According to embodiments of the present invention, the at least one light-leakage-proof electrode is made of an opaque conductive material. Specifically, the opaque conductive material is gold, silver or molybdenum. In this case, the light-leakage-proof electrode itself can serve as a light shielding member, so as to prevent light from passing through and further reduce the light leakage of the display device.

According to embodiments of the present invention, the at least one light-leakage-proof electrode is made of a transparent conductive material and cooperates with a common electrode on a corresponding alignment substrate such that at least a portion of light cannot be emitted out from the gap. Specifically, the transparent conductive material is indium tin oxide or indium zinc oxide.

Although the light-leakage-proof electrode is transparent in this case, it can cooperate with the common electrode on the alignment substrate such that at least a portion of light cannot be emitted out from the gap, thereby further reducing the light leakage of the display device.

According to embodiments of the present invention, the pixel regions comprise pixel electrodes, and the vertical projection of the light-leakage-proof electrode on the base substrate covers an area between the vertical projections of two adjacent ones of the pixel electrodes on the base substrate. Thus the light-leakage-proof electrode not only shields the gap between the pixel regions and the signal line, but also shields the signal line per se, thereby further reducing the light leakage of the display device.

Exemplarily, the signal line is a data line. The array substrate further comprises a thin film transistor for electrically connecting the data line and the pixel electrodes, and the vertical projection of the light-leakage-proof electrode on the base substrate and the vertical projection of the thin film transistor on the base substrate do not overlap, which ensures that the light-leakage-proof electrode will not influence normal functions of the thin film transistor.

According to embodiments of the present invention, two adjacent ones of the light-leakage-proof electrodes are electrically connected with each other via a connection electrode, and thereby different light-leakage-proof electrodes are brought into conduction to achieve an integral light-leakage-proof electrode.

According to embodiments of the present invention, the array substrate further comprises a common electrode line perpendicular to the data line, the vertical projection of the common electrode line on the base substrate and the vertical projection of the pixel electrodes on the base substrate overlap each other, and the vertical projection of the connection electrode on the base substrate falls within the vertical projection of the common electrode line on the base substrate.

According to embodiments of the present invention, the layer of the light-leakage-proof electrode is situated between the layer of the pixel electrodes and the layer of the signal line, the layer of the light-leakage-proof electrode and the layer of the pixel electrodes have a first insulation layer disposed therebetween, and the layer of the light-leakage-proof electrode and the layer of the signal line have a second insulation layer disposed therebetween.

According to embodiments of the present invention, the layer of the light-leakage-proof electrode is located above the layer of the pixel electrodes, and the layer of the light-leakage-proof electrode and the layer of the pixel electrodes have a first insulation layer disposed therebetween.

As can be seen, the layer positions of the light-leakage-proof electrode and the pixel electrodes can be flexibly varied upon specific situations.

Besides, according to embodiments of the present invention, a display device is further provided, the display device comprising any of the array substrates as mentioned above.

The present invention further provides a method for manufacturing an array substrate by adopting a technical solution as follows.

A method for manufacturing an array substrate, comprising:
  forming a signal line on a base substrate; and
  forming pixel regions and at least one light-leakage-proof electrode;
  wherein the pixel regions and the signal line have a gap therebetween, the light-leakage-proof electrode is arranged to be insulated from the pixel regions and the signal line, and the vertical projection of the light-leakage-proof electrode on the base substrate at least covers a portion of the vertical projection of the gap on the base substrate.

The method for manufacturing an array substrate provided according to embodiments of the present invention comprises: forming a signal line on a base substrate; and forming pixel regions and at least one light-leakage-proof electrode. Since the formed pixel regions and signal line have a gap therebetween, the light-leakage-proof electrode is arranged to be insulated from the pixel regions and the signal line, and the vertical projection of the light-leakage-proof electrode on the base substrate at least covers a portion of the vertical projection of the gap on the base substrate, the light-leakage-proof electrode can at least shield a portion of light emitted from a light source towards the gap such that the portion of light cannot be emitted out of the display device, which reduces the light leakage of the display device, increases the contrast of the display device and ameliorates the display effect of the display device.

According to embodiments of the present invention, the at least one light-leakage-proof electrode is made of an opaque conductive material. Specifically, the opaque conductive material is gold, silver or molybdenum. In this case, the light-leakage-proof electrode itself can serve as a light shielding member, so as to prevent light from passing through and further reduce the light leakage of the display device.

According to embodiments of the present invention, the at least one light-leakage-proof electrode is made of a transparent conductive material and cooperates with a common electrode on a corresponding alignment substrate such that at least a portion of light cannot be emitted out from the gap. Specifically, the transparent conductive material is indium tin oxide or indium zinc oxide. Although the light-leakage-proof electrode is transparent in this case, it can cooperate with the common electrode on the alignment substrate such that at least a portion of light cannot be emitted out from the gap, thereby further reducing the light leakage of the display device.

According to embodiments of the present invention, the step of forming pixel regions and at least one light-leakage-proof electrode specifically comprises: first forming at least one light-leakage-proof electrode, and then forming pixel regions.

Exemplarily, the step of forming at least one light-leakage-proof electrode specifically comprises: forming a second insulation layer on the base substrate on which the signal line has been formed; as well as forming a light-leakage-proof electrode material layer on the base substrate on which the second insulation layer has been formed, and forming a pattern comprising the light-leakage-proof electrode by a one-stage-patterning process, Moreover, the step of forming pixel regions specifically comprises: forming a first insulation layer on the base substrate on which the light-leakage-proof electrode has been formed; as well as forming a pixel electrode material layer on the base substrate on which the first insulation layer has been formed, and forming a pattern comprising the pixel electrodes by a one-stage-patterning process.

According to embodiments of the present invention, the step of forming pixel regions and at least one light-leakage-proof electrode specifically comprises: first forming pixel regions, and then forming at least one light-leakage-proof electrode.

Exemplarily, the step of forming pixel regions specifically comprises: forming a pixel electrode material layer on the base substrate on which the signal line has been formed, and forming a pattern comprising the pixel electrodes by a one-stage-patterning process, Moreover, the step of forming at least one light-leakage-proof electrode specifically comprises: forming a first insulation layer on the base substrate on which the pixel electrodes have been formed; as well as forming a light-leakage-proof electrode material layer on the base substrate on which the first insulation layer has been formed, and forming a pattern comprising the light-leakage-proof electrode by a one-stage-patterning process.

As can be seen, the sequence of forming the light-leakage-proof electrode and the pixel electrodes can be flexibly varied upon specific situations.

As is used throughout the text, the term "vertical projection of A on B" refers to the projection area of A obtained on B after projecting A along a direction perpendicular to B.

BRIEF DESCRIPTION OF DRAWINGS

In order to explain the technical solutions according to embodiments of the present invention or in the prior art more clearly, the figures to be used in the description of the embodiments shall be briefly introduced as follows. Obviously, the figures in the following description are only some embodiments of the present invention. For those having ordinary skills in the art, on the premise of making no inventive efforts, they can further obtain other figures based on these figures.

FIG. 1 is a schematic plan view of an array substrate in the prior art;

FIG. 2 is a schematic sectional view of a display device in the prior art along a direction perpendicular to the extension direction of the data line;

LIST OF THE REFERENCE SIGNS

1—array substrate
10—base substrate
11—pixel region
111—pixel electrode
12—signal line
121—data line
13—gap
14—light-leakage-proof electrode
15—thin film transistor
16—connection electrode
17—first insulation layer
18—second insulation layer
2—light source
3—lower polarizer
4—liquid crystal molecular layer
5—color filter substrate
51—common electrode
52—black matrix
53—color filter layer
6—upper polarizer

DETAILED DESCRIPTION OF EMBODIMENTS

The technical solutions according to embodiments of the present invention shall be described as follows in a clear and complete manner with reference to the drawings according to embodiments of the present invention. Obviously, the embodiments described here are only a part of the embodiments of the present invention, rather than all of them. Based on the embodiments of the present invention, all other embodiments obtained by those having ordinary skills in the art without inventive efforts, shall fall within the protection scope of the present invention.

Embodiment I

Figure 3:
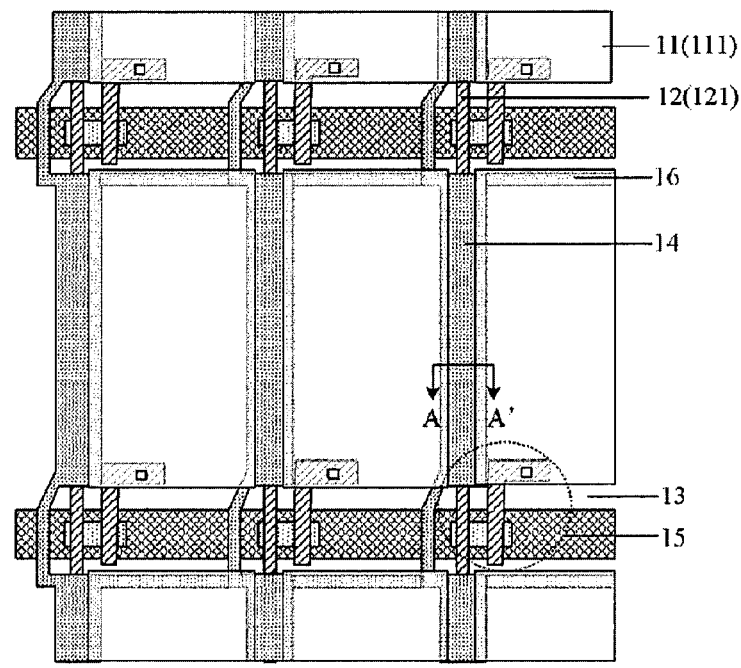
FIG. 3 is a schematic plan view of a first array substrate according to embodiments of the present invention.
Figure 4:
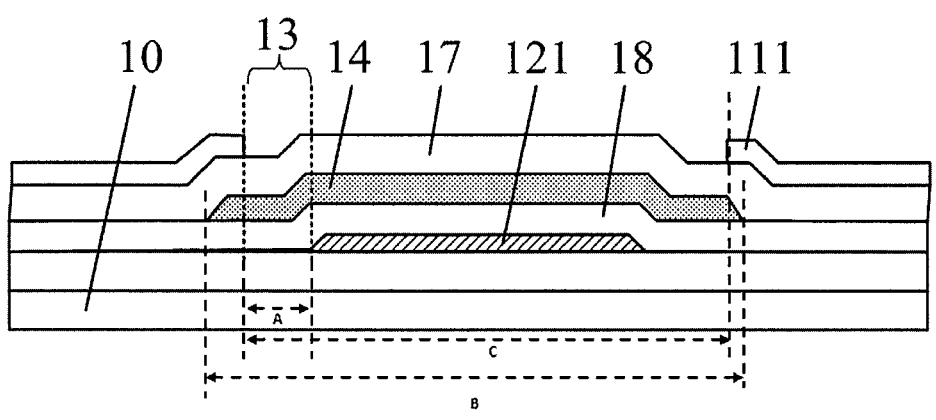
FIG. 4 is a schematic sectional view of the array substrate according to embodiments of the present invention along the A-A' direction in FIG. 3.

According to this embodiment of the present invention, an array substrate is provided. Specifically, as shown in FIGS. 3 and 4, the array substrate 1 comprises pixel regions 11 arranged in arrays, two adjacent ones of the pixel regions 11 having a signal line 12 arranged therebetween, and the pixel regions 11 and the signal line 12 having a gap 13 therebetween; wherein the array substrate 1 further comprises at least one light-leakage-proof electrode 14 arranged to be insulated from the pixel regions 11 and the signal line 12, and the vertical projection B of the light-leakage-proof electrode 14 on the base substrate 10 at least covers a portion of the vertical projection A of the gap 13 on the base substrate 10.

Exemplarily, the material of the light-leakage-proof electrode 14 can be a transparent conductive material such as indium tin oxide (ITO) or indium zinc oxide (IZO), or an opaque conductive material such as gold (Au), silver (Ag) or molybdenum (Mo). When the light-leakage-proof electrode 14 is made of an opaque conductive material, it can prevent light from passing through by itself such that the light-leakage-proof electrode 14 can further reduce the light leakage of the display device. When the light-leakage-proof electrode 14 is made of a transparent conductive material, it can be arranged in the same layer as the pixel electrodes 111 comprised by the pixel regions 11 so as to simplify the method for manufacturing the array substrate and reduce its cost. The specific material of the light-leakage-proof electrode 14 is not defined in this embodiment of the present invention, and it can be selected by those skilled in the art upon actual needs.

An array substrate comprising the above structure is provided according to embodiments of the present invention. Since the array substrate comprises at least one light-leakage-proof electrode arranged to be insulated from the pixel regions and the signal line, and the vertical projection of the light-leakage-proof electrode on the base substrate at least covers a portion of the vertical projection of the gap on the base substrate, the light-leakage-proof electrode can at least shield a portion of light emitted by a light source towards the gap such that the portion of light cannot be emitted out of the display device, which reduces the light leakage of the display device, increases the contrast of the display device and ameliorates the display effect of the display device.

In order to help those skilled in the art better understand the invention, detailed analysis will be given as follows as to how the light-leakage-proof electrode 4 reduces the light leakage of the display device, by taking as an example the display device, comprising the array substrate in this embodiment of the present invention, being a twisted nematic type liquid crystal display device in a normally white mode.

Figure 5:
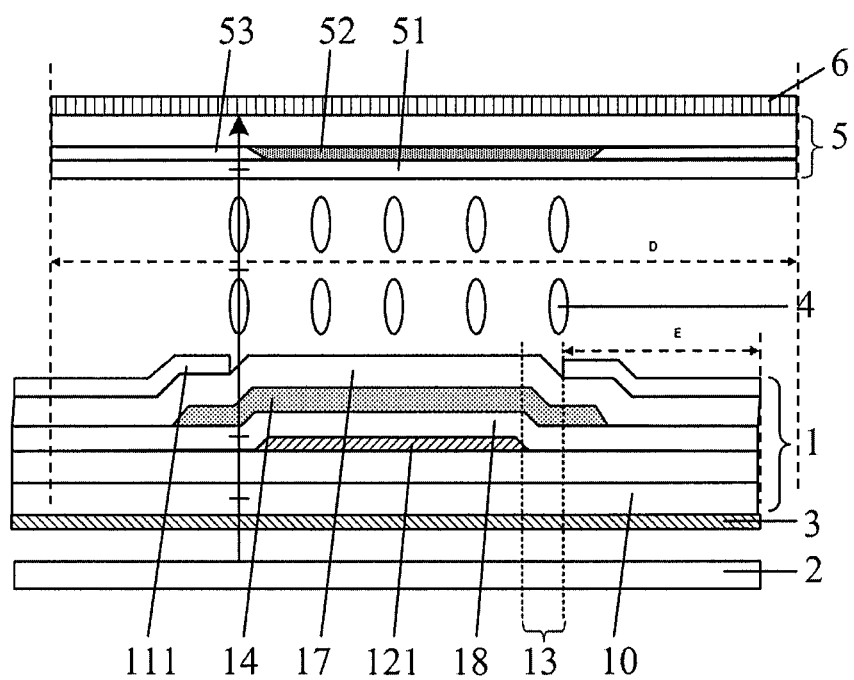
FIG. 5 is a partial schematic sectional view of a display device according to embodiments of the present invention.

As shown in FIG. 5, the display device comprises a light source 2, a lower polarizer 3, an array substrate 1, a liquid crystal molecular layer 4, a color filter substrate 5 and an upper polarizer 6 stacked sequentially. In this case, the transmission axis direction of the lower polarizer 3 and the transmission axis direction of the upper polarizer 6 are perpendicular to each other, and a plate-like common electrode 51 is disposed on the color filter substrate 5. During the use of the display device, an electric field is formed between the light-leakage-proof electrode 14 on the array substrate 1 and the common electrode 51 on the color filter substrate 5 in this embodiment of the present invention, which makes the liquid crystal molecules situated where the light-leakage-proof electrode 14 is disposed all arranged in a direction perpendicular to the array substrate 1 along a long axis, such that light passing through the lower polarizer 3 does not change its polarization state after passing through this portion of liquid crystal molecules, and thus cannot be emitted out from the upper polarizer 6. Therefore, due to the arrangement of the light-leakage-proof electrode 14, at least a portion of light emitted by the light source 2 towards the gap cannot be emitted out of the display device, and thus the light leakage of the display device can be reduced, the contrast of the display device can be increased and the display effect of the display device can be ameliorated.

During driving the display device, methods for driving structures other than the light-leakage-proof electrode 14 are the same as or similar to those in the prior art. As for the light-leakage-proof electrode 14, it is only necessary to keep inputting a fixed signal into the light-leakage-proof electrode 14 during driving the display device so as to form an electric field between the light-leakage-proof electrode 14 and the common electrode 51 on the color filter substrate 5, such that the liquid crystal molecules situated where the light-leakage-proof electrode 14 is disposed are all arranged in a direction perpendicular to the array substrate 1 along a long axis. The method for driving the display device will not be described herein for simplicity in this embodiment of the present invention.

Furthermore, the pixel regions 11 comprise pixel electrodes 111, and the vertical projection B of the light-leakage-proof electrode 14 on the base substrate 10 covers an area C between the vertical projections of two adjacent ones of the pixel electrodes 111 on the base substrate 10 such that the light-leakage-proof electrode 14 can fully shield the light emitted towards an area between two adjacent pixel electrodes 111 to completely eliminate the light leakage at the gap 13, thereby reducing the light leakage of the display device to the greatest extent, increasing the contrast of the display device and ameliorating the display effect of the display device.

Exemplarily, the signal line 12 can be a data line and/or a gate line arranged on the array substrate 1, i.e., the signal line 12 is a data line, or the signal line 12 is a gate line, or the signal line 12 comprises both a data line and a gate line. In this case, when the signal line 12 comprises both a data line and a gate line, the vertical projection B of the light-leakage-proof electrode 14 on the base substrate 10 at least covers a portion of the vertical projection A of the gap 13 between the data line and the pixel regions 11 on base substrate 10, and a portion of the vertical projection A of the gap 13 between the gate line and the pixel regions 11 on the base substrate 10 as well, such that the arrangement of the light-leakage-proof electrode 14 can reduce the light leakage of the display device, no matter whether the array substrate 1 is misaligned with the color filter substrate 5 in a direction parallel with the extension direction of the gate line or in a direction parallel with the extension direction of the data line.

The inventor of the present application found that, when the array substrate 1 is aligned with the color filter substrate 5, there is usually misalignment along a direction parallel with the extension direction of the gate line, so light leakage often takes place at the gap 13 between the data line and the pixel regions 11. In order to simplify the method for manufacturing the array substrate 1, in this embodiment of the present invention, preferably as shown in FIG. 3, the signal line 12 is a data line 121, i.e., the vertical projection B of the light-leakage-proof electrode 14 on the base substrate 10 at least covers a portion of the vertical projection A of the gap 13 between the data line 121 and the pixel regions 11 on the base substrate 10.

Furthermore, when the signal line 12 is a data line 121, the array substrate 1 further comprises a thin film transistor 15 for electrically connecting the data line 121 and the pixel electrodes 111, and the vertical projection B of the light-leakage-proof electrode 14 on the base substrate 10 and the vertical projection of the thin film transistor 15 on the base substrate 10 do not overlap, thereby avoiding mutual influences between the light-leakage-proof electrode 14 and the thin film transistor 15 and facilitating amelioration for the display effect of the display device.

Furthermore, two adjacent light-leakage-proof electrodes 14 are electrically connected via a connection electrode 16 such that all light-leakage-proof electrodes 14 can be connected in a conductive mesh so as to decrease the resistance of the light-leakage-proof electrodes 14. Thereby, the IR drop of the light-leakage-proof electrodes 14 can be reduced and the uniformity of signals on the light-leakage-proof electrodes 14 can be improved.

Furthermore, the array substrate 1 further comprises a common electrode line (as an example, referring to FIG. 5, 51) perpendicular to the data line 121, and the vertical projection (with reference to FIG. 5, D) of the common electrode line on the base substrate 10 and the vertical projection E of the pixel electrodes 111 on the base substrate 10 overlap each other such that the common electrode line and the pixel electrodes 111 form a storage capacitance, so as to achieve display by means of the pixel regions 11. Furthermore, the vertical projection of the connection electrode 16 on the base substrate 10 falls within the vertical projection (with reference to FIG. 5, D) of the common electrode line on the base substrate 10, such that the aperture ratio of the array substrate 1 will not be lowered due to the arrangement of the connection electrode 16.

It should be noted that what is described above all relates to the planar positional relationships between the light-leakage-proof electrode 14 and structures such as the pixel electrodes 111 of the pixel regions 11, the signal line or the like, and the stacked positional relationships between the light-leakage-proof electrode 14 and structures such as the pixel electrodes 111, the signal line 12 or the like in this embodiment of the present invention will be described as follows.

Optionally, as shown in FIG. 4, the layer of the light-leakage-proof electrode 14 is situated between the layer of the pixel electrodes 111 and the layer of the signal line 12, the layer of the light-leakage-proof electrode 14 and the layer of the pixel electrodes 111 have a first insulation layer 17 disposed therebetween, and the layer of the light-leakage-proof electrode 14 and the layer of the signal line 12 have a second insulation layer 18 disposed therebetween, such that the distance between the signal line 12 and the pixel electrodes 111 increases and that the light-leakage-proof electrode 14 can shield signal interferences between the pixel electrodes 111 and the signal line 12, thereby effectively improving the poor crosstalk between the pixel electrodes 111 and the signal line 12 on the array substrate 1.

Figure 6:
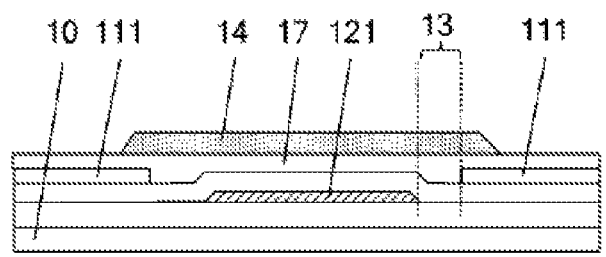
FIG. 6 is a partial schematic sectional view of a second array substrate according to embodiments of the present invention.

Optionally, as shown in FIG. 6, the layer of the light-leakage-proof electrode 14 is situated above the layer of the pixel electrodes 111, and the layer of the light-leakage-proof electrode 14 and the layer of the pixel electrodes 111 have a first insulation layer 17 disposed therebetween, such that the light-leakage-proof electrode 14 is close to both the liquid crystal molecular layer 4 and the common electrode 51 on the color filter substrate 5 and that the light-leakage-proof electrode 14 has strong control over the liquid crystal molecules, which can better reduce the light leakage of the display device, increase the contrast of the display device and ameliorate the display effect of the display device.

Besides, according to embodiments of the present invention, a display device comprising any of the above array substrates is further provided. Specifically, as shown in FIG. 5, the display device further comprises a light source 2, a lower polarizer 3, a liquid crystal molecular layer 4, a color filter substrate 5 and an upper polarizer 6. In this case, the light source 2, the array substrate 1, the lower polarizer 3, the liquid crystal molecular layer 4, the color filter substrate 5 and the upper polarizer 6 are stacked sequentially; the transmission axis direction of the lower polarizer 3 and the transmission axis direction of the upper polarizer 6 are perpendicular to each other; and the color filter substrate 5 is provided thereon with a grid-like black matrix 52, a color filter layer 53 located within an area enclosed by the black matrix 52, and a common electrode 51 covering the black matrix and the color filter layer.

Due to the above structure of the array substrate comprised in the display device, the light leakage of the display device is reduced, the contrast of the display device is increased and the display effect of the display device is ameliorated.

Embodiment II

The present invention provides a manufacturing method for manufacturing the array substrate as mentioned in embodiment I. Specifically, the manufacturing method comprises the following steps.

Step S701: forming a signal line.

The step of forming a signal line may differ based on what kind of specific structure the signal line is. Exemplarily, when the signal line is a gate line, the step of forming a signal line comprises: forming a gate metal layer and forming a pattern comprising a gate line by a patterning process. When the signal line is a data line, the step of forming a signal line comprises: forming a source-drain metal layer and forming a pattern comprising a data line by a patterning process. When the signal line comprises both a gate line and a data line, the step of forming a signal line comprises: forming a gate metal layer and forming a pattern comprising a gate line by a patterning process, as well as forming a source-drain metal layer and forming a pattern comprising a data line through a patterning process.

It should be noted that, unless particularly indicated, the patterning process in this embodiment of the present invention comprises steps of coating a photoresist and masking by using a mask plate having a pattern, exposing, developing, etching and stripping the photoresist.

Step S702: forming pixel regions and at least one light-leakage-proof electrode.

Exemplarily, when the pixel regions comprise pixel electrodes, the step of forming pixel regions comprises: forming a pixel electrode material layer and forming a pattern comprising pixel electrodes by a patterning process. Exemplarily, the step of forming at least one light-leakage-proof electrode comprises: forming a light-leakage-proof electrode material layer and forming a pattern comprising at least one light-leakage-proof electrode by a patterning process. In this case, the pixel regions and the signal line have a gap therebetween, the light-leakage-proof electrode is arranged to be insulated from the pixel regions and the signal line, and the vertical projection of the light-leakage-proof electrode on the base substrate at least covers a portion of the vertical projection of the gap on the base substrate.

The method for manufacturing an array substrate provided in this embodiment of the present invention may further comprise steps which are the same as or similar to those in a method for manufacturing an array substrate in the prior art, which will not be discussed for simplicity in this embodiment of the present invention.

In order to help those skilled in the art to better understand the invention, this embodiment of the present invention provides two of the most detailed methods for manufacturing an array substrate as follows.

The first manufacturing method, used for manufacturing the array substrate 1 as shown in FIG. 4, i.e., the layer of the light-leakage-proof electrode 14 on the array substrate 1 is situated between the layer of the pixel electrodes 111 and the layer of the signal line 12, the layer of the light-leakage-proof electrode 14 and the layer of the pixel electrodes 111 have a first insulation layer 17 disposed therebetween, and the layer of light-leakage-proof electrode 14 and the layer of the signal line 12 have a second insulation layer 18 disposed therebetween.

Exemplarily, the first manufacturing method comprises first forming a light-leakage-proof electrode and then forming pixel electrodes, specifically as follows.

Step S801: forming a second insulation layer on the base substrate on which the signal line has been formed.

Step S802: forming a light-leakage-proof electrode material layer on the base substrate on which the second insulation layer has been formed, and forming a pattern comprising a light-leakage-proof electrode by a one-stage-patterning process.

Step S803: forming a first insulation layer on the base substrate on which the light-leakage-proof electrode has been formed.

Step S804: forming a pixel electrode material layer on the base substrate on which the first insulation layer has been formed, and forming a pattern comprising pixel electrodes by a one-stage-patterning process.

The second manufacturing method, used for manufacturing the array substrate 1 as shown in FIG. 6, i.e., the layer of the light-leakage-proof electrode 14 on the array substrate 1 is situated above the layer of the pixel electrodes 111, and the layer of the light-leakage-proof electrode 14 and the layer of the pixel electrodes 111 have a first insulation layer 17 disposed therebetween.

Exemplarily, the second manufacturing method comprises first forming pixel electrodes and then forming a light-leakage-proof electrode, specifically as follows.

Step S901: forming a pixel electrode material layer on a base substrate and forming a pattern comprising pixel electrodes by a one-stage-patterning process.

Step S902: forming a first insulation layer on the base substrate on which the pixel electrodes have been formed.

Step S903: forming a light-leakage-proof electrode material layer on the base substrate on which the first insulation layer has been formed, and forming a pattern comprising a light-leakage-proof electrode by a one-stage-patterning process.

According to this embodiment of the present invention, a method for manufacturing an array substrate is provided, the manufacturing method comprising: forming a signal line on a base substrate; and forming pixel regions and at least one light-leakage-proof electrode on the base substrate. Since the formed pixel regions and signal line have a gap therebetween, the light-leakage-proof electrode is arranged to be insulated from the pixel regions and the signal line, and the vertical projection of the light-leakage-proof electrode on the base substrate at least covers a portion of the vertical projection of the gap on the base substrate, the light-leakage-proof electrode can at least shield a portion of light emitted from a light source towards the gap such that the portion of light cannot be emitted out of the display device, which can reduce the light leakage of the display device, increase the contrast of the display device and ameliorate the display effect of the display device.

What is mentioned above is only specific embodiments of the present invention, but the protection scope of the present invention shall not be limited thereto. Any modification or substitution easily conceivable for the skilled person who is familiar with this art within the technical disclosure of the present invention shall fall within the protection scope of the present invention. Therefore, the protection scope of the present invention should be subject to the protection scope of the claims.

The invention claimed is:

1. An array substrate, comprising a plurality of pixel regions arranged in arrays on a base substrate, two adjacent ones of the pixel regions having a signal line arranged therebetween, the pixel regions and the signal line having a gap therebetween, wherein the array substrate further comprises at least one light-leakage-proof electrode arranged to be insulated from the pixel regions and the signal line, and a vertical projection of the light-leakage-proof electrode on the base substrate at least covers a portion of a vertical projection of the gap on the base substrate, and wherein the at least one light-leakage-proof electrode is made of a transparent conductive material and cooperates with a common electrode on a corresponding alignment substrate such that at least a portion of light cannot be emitted out from the gap.

2. The array substrate according to claim 1, wherein the at least one light-leakage-proof electrode is made of an opaque conductive material.

3. The array substrate according to claim 2, wherein the opaque conductive material is gold, silver or molybdenum.

4. The array substrate according to claim 1, wherein the transparent conductive material is indium tin oxide or indium zinc oxide.

5. The array substrate according to claim 1, wherein the pixel regions comprise pixel electrodes, and the vertical projection of the light-leakage-proof electrode on the base substrate covers an area between vertical projections of two adjacent ones of the pixel electrodes on the base substrate.

6. The array substrate according to claim 5, wherein the signal line is a data line, the array substrate further comprises a thin film transistor for electrically connecting the data line and the pixel electrodes, and the vertical projection of the light-leakage-proof electrode on the base substrate and a vertical projection of the thin film transistor on the base substrate do not overlap each other.

7. The array substrate according to claim 6, wherein two adjacent ones of the light-leakage-proof electrodes are electrically connected with each other via a connection electrode.

8. The array substrate according to claim 7, further comprising a common electrode line perpendicular to the data line, a vertical projection of the common electrode line on the base substrate and the vertical projection of the pixel electrodes on the base substrate overlap each other, and a vertical projection of the connection electrode on the base substrate falls within the vertical projection of the common electrode line on the base substrate.

9. The array substrate according to claim 5, wherein the layer of the light-leakage-proof electrode is located between the layer of the pixel electrodes and the layer of the signal line, the layer of the light-leakage-proof electrode and the layer of the pixel electrodes have a first insulation layer disposed therebetween, and the layer of the light-leakage-proof electrode and the layer of the signal line have a second insulation layer disposed therebetween.

10. The array substrate according to claim 5, wherein the layer of the light-leakage-proof electrode is located above the layer of the pixel electrodes, and the layer of the light-leakage-proof electrode and the layer of the pixel electrodes have a first insulation layer disposed therebetween.

11. A display device comprising the array substrate according to claim 1.

12. A method for manufacturing an array substrate, comprising:

forming a signal line on a base substrate; and forming pixel regions and at least one light-leakage-proof electrode;

wherein the pixel regions and the signal line have a gap therebetween, the light-leakage-proof electrode is arranged to be insulated from the pixel regions and the signal line, and a vertical projection of the light-leakage-proof electrode on the base substrate at least covers a portion of a vertical projection of the gap on the base substrate, and wherein the at least one light-leakage-proof electrode is made of a transparent conductive material and cooperates with a common electrode on a corresponding alignment substrate such that at least a portion of light cannot be emitted out from the gap.

13. The method for manufacturing an array substrate according to claim 12, wherein the at least one light-leakage-proof electrode is made of an opaque conductive material.

14. The method for manufacturing an array substrate according to claim 12, wherein the step of forming pixel regions and at least one light-leakage-proof electrode comprises: first forming at least one light-leakage-proof electrode, and then forming pixel regions.

15. The method for manufacturing an array substrate according to claim 14, wherein the step of forming at least one light-leakage-proof electrode comprises:

forming a second insulation layer on the base substrate on which the signal line has been formed; and forming a light-leakage-proof electrode material layer on the base substrate on which the second insulation layer has been formed, and forming a pattern comprising the light-leakage-proof electrode by a one-stage-patterning process, and wherein the step of forming pixel regions comprises:

forming a first insulation layer on the base substrate on which the light-leakage-proof electrode has been formed; and forming a pixel electrode material layer on the base substrate on which the first insulation layer has been formed, and forming a pattern comprising the pixel electrodes by a one-stage-patterning process.

16. The method for manufacturing an array substrate according to claim 12, wherein the step of forming pixel regions and at least one light-leakage-proof electrode comprises: first forming pixel regions, and then forming at least one light-leakage-proof electrode.

17. The method for manufacturing an array substrate according to claim 16, wherein the step of forming pixel regions comprises:

forming a pixel electrode material layer on the base substrate on which the signal line has been formed, and forming a pattern comprising the pixel electrodes by a one-stage-patterning process, and wherein the step of forming at least one light-leakage-proof electrode comprises:

forming a first insulation layer on the base substrate on which the pixel electrodes have been formed; and forming a light-leakage-proof electrode material layer on the base substrate on which the first insulation layer has been formed, and forming a pattern comprising a light-leakage-proof electrode by a one-stage-patterning process.

* * * * *